United States Patent [19]
Kachergis

[11] 3,897,042
[45] July 29, 1975

[54] BALL COCK VALVE

[76] Inventor: Henry J. Kachergis, 335 Washington St., Waterbury, Conn. 06706

[22] Filed: July 9, 1973

[21] Appl. No.: 377,398

Related U.S. Application Data

[63] Continuation-in-part of Ser. No. 209,595, Dec. 20, 1971, abandoned.

[52] U.S. Cl. .................. 251/77; 251/82; 251/84; 137/533.21
[51] Int. Cl.² ........................................ F16K 33/00
[58] Field of Search .......... 137/436, 437, 441, 442, 137/444, 533.21; 251/77, 78, 82, 320, 357, 361, 84

[56] References Cited
UNITED STATES PATENTS

| | | | |
|---|---|---|---|
| 1,223,170 | 4/1917 | Hodgson | 137/436 X |
| 1,274,924 | 8/1918 | Michaels | 137/437 |
| 1,334,566 | 3/1920 | Steinmetz | 251/82 |
| 1,693,676 | 12/1928 | Spinelle | 251/82 |
| 2,599,426 | 6/1952 | Barling | 137/444 |
| 2,701,119 | 2/1955 | Smith | 137/444 UX |
| 3,145,010 | 8/1964 | Karr | 251/361 X |
| 3,172,128 | 3/1965 | Ducey | 137/444 X |
| 3,540,472 | 11/1970 | Brady et al. | 137/533.21 X |
| 3,549,119 | 12/1970 | Sellers | 251/84 |
| 3,709,246 | 1/1973 | Kachergis | 137/441 X |

*Primary Examiner*—Henry T. Klinksiek
*Attorney, Agent, or Firm*—Harold F. Johnston

[57] ABSTRACT

A ball cock valve wherein the plunger is provided with a socket in which is received a sealing member with a relatively loose free fit, and is capable of moving rapidly and independently of the plunger. Also, the plunger socket and sealing member have similar frustoconical surfaces that are always in spaced relationship to each other regardless of the position of the sealing member which function to prevent any jamming in case any foreign matter should become lodged between sealing member and wall of the plunger socket.

6 Claims, 4 Drawing Figures

PATENTED JUL 29 1975 3,897,042

BALL COCK VALVE

This invention is a continuation-in-part of my previous application, Ser. No. 209,595, filed Dec. 20, 1971 now abandoned.

This invention relates to ball cocks making use of a minimum number of operating parts to effect substantial savings in the cost of manufacture and particularly to a very simple housing construction.

A principle feature of the invention is the construction of the plunger and a free-floating sealing member in the form of a headed stem associated with the plunger, the stem effecting a leak-proof seal with a valve gasket member supported in the valve housing when the valve is in closed position, regardless of axial position of said sealing member.

Another feature of the free-floating sealing member is that it serves as an anti-syphon check valve in case any back siphonage forces should develop in the valve housing.

A further feature is to construct the sealing member and the plunger in such a manner as to prevent their jamming in case any foreign matter should become lodged between the relative movable parts.

Other objects and advantages will be readily apparent from the following description.

A preferred embodiment of the invention is illustrated in the accompanying drawing in which.

Figure 1:
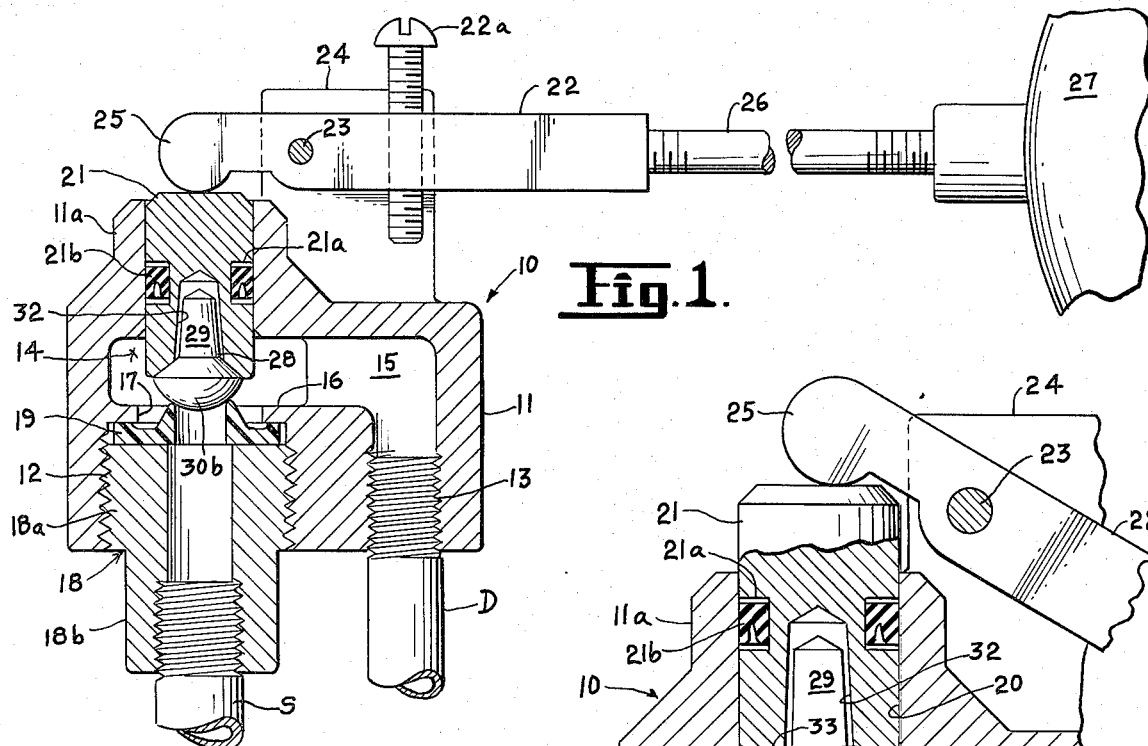
FIG. 1 is a vertical cross-sectional view of a ball cock valve embodying my invention showing the valve in closed position.

Referring more particularly to the drawing, the reference numeral 10 indicates generally a ball cock valve structure consisting of a cast body or casing 11 having in its base portion a larger tapped hole 12 and a smaller tapped hole 13. The valve body 11 is formed with a discharge chamber 14 having a lateral port 15 leading into the smaller tapped hole 13. The valve body 11 has a partition wall 16 which separates the discharge chamber 14 from the larger tapped hole 12 and is formed with an opening 17 therein aligned with the ball cock axis and which opening in fact becomes a downward extension of said discharge chamber 14.

A hollow bushing 18 is provided having an enlarged threaded section 18a and a reduced section 18b. This hollow bushing, as shown, defines the inlet opening into the discharge chamber 14. The threaded section 18a is screwed into the larger tapped hole 12 of the body and serves to hold a valve gasket member 19 against the underface of the body partition 16. The reduced section 18b has threaded engagement with a supply pipe S by means of which the valve structure 10 is suitably supported in a flush tank (not shown). The lower end of the supply pipe S is connected to the base of the flush tank in the usual manner. The reduced section 18b is made hexagonal in shape to which a wrench may be applied for assembly purposes. Water passing through the ball cock valve will be directed downwardly through a discharge tube or pipe D threadedly connected to a smaller tapped hole of the valve body for refilling the flush tank in the usual manner.

Figure 4:
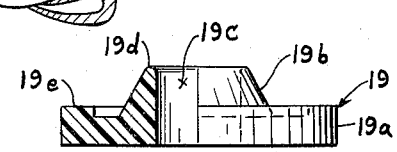
FIG. 4 is a part section and part full view of the valve disc gasket member.

The valve disc gasket 19 (see FIG. 4) is made of a plastic material, preferably "polypropylene" and is in the form of an annular disc 19a with an upward conical section 19b surrounding a central water passage 19c and terminating in a round annular valve-seating surface 19d. The disc 19a is formed with an upward peripheral rim 19e that seats against the undersurface of the partition wall 16 to effect a better seal when compressed between said wall 16 and the adjacent surface of the bushing 18 when the latter is forced home into tight assembly.

The valve body 11 is formed with an upward boss 11a with a central bore 20 in which reciprocates a valve plunger 21. The plunger has a circumferential annular groove 21a carrying a U-type of rubber seal 21b therein to prevent upward leakage. The plunger is operated in the usual manner by a lever 22 pivoted on a cross pin 23 supported in a pair of ears 24 which are integral with and extend upwardly from the valve body 11. The inner end of the lever 22 is formed with a cylindrical surface 25 for bearing engagement against the upper face of the plunger 21. A float arm 26 is threaded into the opposite end of lever 22 and carries at its outer end the usual ball float 27 that is actuated by the rising water in the flush tank to move the valve plunger 21 to closed position in the well-known manner. An adjusting screw 22a is threaded into the lever 22 and is adapted to strike against the upper surface of body 11 for controlling the downward swing of said lever.

Figure 2:
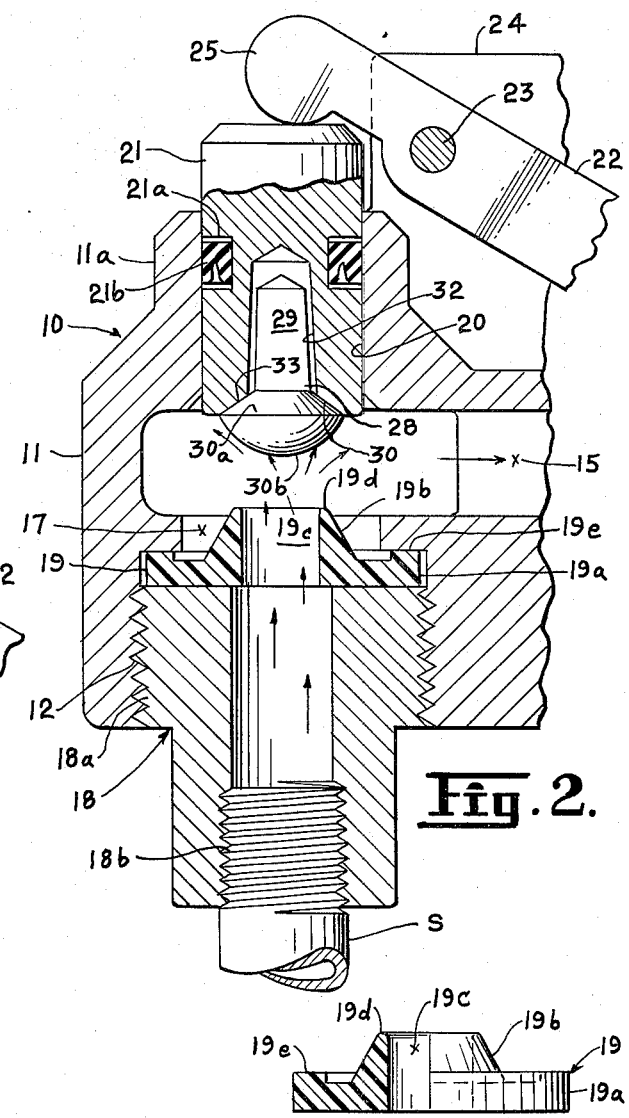
FIG. 2 is a similar view to FIG. 1 of a portion of the valve structure on a larger scale showing the valve in an open position.

One of the distinctive features of my invention is a free floating plunger sealing member or stem 28 preferably made entirely of rubber material and consisting of a guide frusto-conical pin 29, an enlarged head 30 at its lower end in the form of a upper conical section 30a and a lower spherical section 30b. The guide pin 29 is positioned and operates in a similar frusto-conical axial socket 32 formed in the plunger 21, said socket having an inner closed end and a lower open end defined by an outwardly flaring bevel surface 33. The exterior conical wall of the guide pin 29 and the interior conical wall of the socket 32 are so dimensioned as to provide a clearance between said walls at all times thus providing for a relatively loose free fit of the pin 29 within its respective socket 32 even when the valve is in either closed or open position as shown in FIGS. 1 and 2, respectively.

It is well known that the average water supply systems contain some amount of sand or other foreign particles which are capable of jamming closely fitted slidable parts such as the adjacent surfaces between a valve pin and the wall of its complemental socket and "freeze" the parts together. This can often occur when a fire hydrant is opened for fighting fire or when periodically opened for test purposes. To overcome this fault, and make it easier for the ball-cock valve to dislodge and foreign matter, it is to be noted that the bore of the socket 32 and the guide pin 29 of the valve stem 28 are so shaped as to present conically converging surfaces in a downward direction. The clearance between the pin 29 and the socket wall 32 at its point of entrance is in the order of about one thirty-second inch when the valve stem is received in its closed position of FIG. 1.

The fact that a progressively increasing clearance area is provided in an upward direction between plunger socket and its associated sealing stem 28 with their complemental conical surfaces, even if a piece of sand or the like should become lodged and wedged between said surfaces, upon the first impulse of the valve stem to close by moving downwardly will obviously increase the clearance between the complemental conical surfaces and readily loosen up any jammed foreign matter.

As shown in the drawings, a "relatively loose free fit" is of a character such that the exterior surface of the pin 29 is entirely free of and spaced from the conical wall of the socket 32 when the plunger stem 28 is axially aligned within the plunger socket 32 in its uppermost position.

Figure 3:
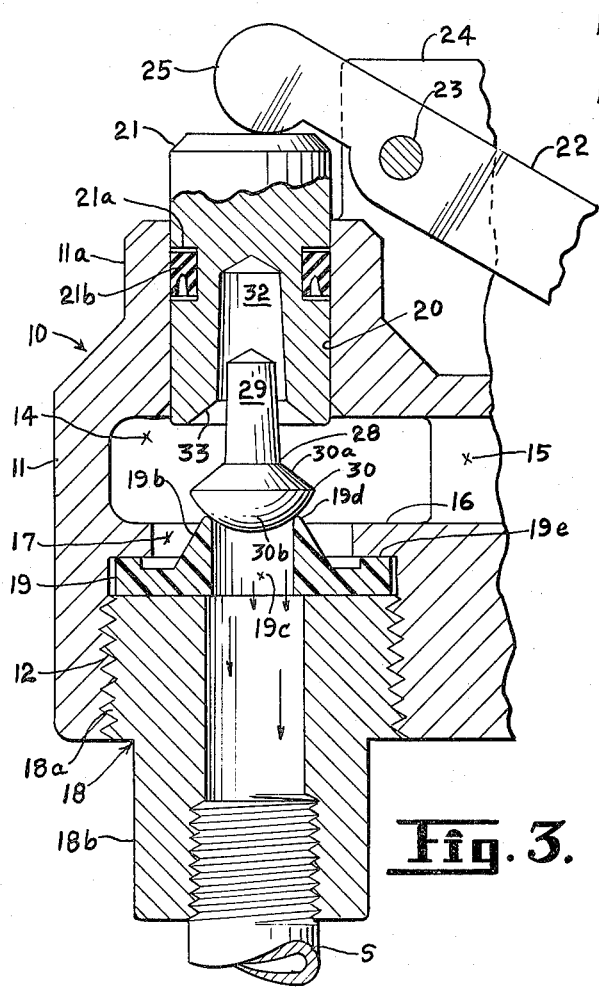
FIG. 3 is a view the same as FIG. 2 and shows the condition of the valve when subjected to a syphonic action.

It is to be noted from FIG. 3, that when the sealing member 28 has fallen free of the plunger 21 and resting upon the gasket 19, the length of the guide pin 29 extends into the socket 32 about one-third of its length. This construction assures the sealing member 28 will not fall out of its normally aligned position in said plunger 21 even when the valve is in full open position.

When the valve is in closed position, the conical section 30a seats against a comparable beveled surface 33 at the entrance end of the plunger socket 32, and the spherical section 31b seats against the rounded terminal upper end 19d of the valve gasket conical section 19b. The fact that the plunger seal stem 28 is made of rubber or like material (relatively soft) and its spherical section 31b seats against the rounded surface 19d of the valve gasket assures a very effective and leak-proof seal in spite the fact that the stem may be in an out-of-alignment or biased position in the plunger socket or for any of the usual manufacturing imperfections that may result in the construction of the valve.

The fact that the plunger seal stem 28 is free to move independently of the plunger 21 makes this ball cock valve a reliable anti-siphon valve by reason of the fact that when any down siphonage action takes place in the supply pipe S as indicated by the arrows in FIG. 3, the plunger valve stem will immediately fall into sealing engagement with the valve disc gasket 19 due to gravity and/or any downward siphonage drag.

In the operation of my ball cock valve, as soon as the water level in the flush tank lowers, the cylindrical head 25 of the lever 22 will rise and due to the liquid pressure forces in the pipe S and said discharge chamber 14 striking against the valve stem head 30, as indicated by the arrows in FIG. 2, the valve stem 28 jointly with the plunger 21 will be forced upwardly against the lever head 25 and move with the upward swing of said head.

It will be understood that modifications within the scope of the appended claims, may be made in the design and arrangement of the parts without departing from the spirit of the invention.

What I claim is:

1. A ball-cock valve comprising in combination a valve casing having a discharge chamber, an inlet port and an outlet port, a valve gasket member secured to said casing and having a portion extending upwardly into the discharge chamber, a boss projecting upwardly from said casing and having a cylindrical bore, a slide plunger slidably fitted in said bore, means for actuating said plunger in said bore, wherein the improvement comprises the structure of the slide plunger having an axial closed-end socket opening through the base of said plunger and presenting an inner conical wall and a lower beveled seat, and a plunger seal member comprising a guide pin of frusto-conical shape and an enlarged head at its lower end, said guide pin being dimensioned to be spaced at all times from the conical wall of said socket whereby said pin will have a relatively loose free fit within said plunger socket, which loose free fit allows said seal member to fall freely and quickly into sealing engagement with said gasket member independently of the position and movement of said plunger, and when the valve is in open position said plunger seal member is held up within said plunger socket with its enlarged head seated against the adjacent face of said plunger by the force of water striking against said head.

2. A ball-cock valve as defined in claim 1, wherein the lower end of the slide plunger is formed with a beveled seat surrounding the entrance end of said plunger socket, and the head of the plunger seal member is formed with an upper conical section and a lower spherical section, said conical section is adapted to seat against the beveled seat of said plunger when the seal member is in the upper valve-open position, and said spherical section is adapted to seat against the upward extending portion of said gasket when the plunger seal member is in its lowermost valve-closed position.

3. A ball-cock valve as defined in claim 1, wherein the wall of the plunger and the surface of the pin are so shaped as to present conically converging surfaces in a downward direction.

4. A ball-cock valve as defined in claim 1 wherein a portion of the length of said guide pin extends upwardly in the socket of said plunger when the latter is in its uppermost position and the sealing member is seated against said gasket for the purpose of maintaining said pin in axial alignment within said plunger socket.

5. A ball cock valve comprising in combination a valve casing having a discharge chamber and an outlet port, a threaded opening provided in the base of said casing, a hollow bushing member fitted into said threaded opening and having means for connecting with a supply pipe, said casing having an upward boss provided with a central axial bore, a plunger slidably fitted in said bore, said improvement consisting in providing a partition wall between said threaded opening and said discharge chamber, said wall having an opening forming in fact a downward extension of said discharge chamber, a valve disc gasket held secure within said casing by being clamped between said partition wall and said bushing, said disc gasket having an upward hollow extension projecting into said chamber, said plunger having an axial closed end socket opening through its base end, and a valve stem dimensioned and positioned to provide a relatively loose free fit in said plunger socket, said stem having an enlarged head outwardly of said socket and cooperating with the extension of said valve gasket to effect a leak-proof seal when the valve is in a closed position, the loose free fit of said valve stem allowing said stem to fall freely and quickly independently of the position and movement of said plunger and cause the enlarged head to seat against the gasket upward extension.

6. A ball cock valve as defined in claim 5 wherein the outer edge of the gasket is formed with an upward peripheral rim that is adapted to be clamped between the partition wall and adjacent surface of the bushing.

* * * * *